Figure 1:
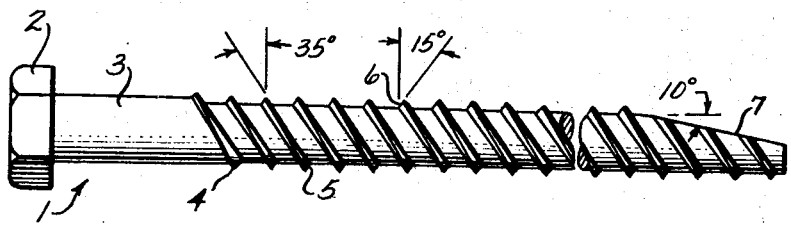

June 6, 1944.  C. R. GASKELL  2,350,346

SELF-TAPPING SCREW

Filed April 14, 1943

INVENTOR
CLIFFORD R. GASKELL
BY
ATTORNEYS

Patented June 6, 1944

2,350,346

UNITED STATES PATENT OFFICE 2,350,346

SELF-TAPPING SCREW

Clifford R. Gaskell, Dayton, Ohio

Application April 14, 1943, Serial No. 483,007

1 Claim. (Cl. 85—47)

(Granted under the act of March 3, 1883, as amended April 30, 1928; 370 O. G. 757)

The invention described herein may be manufactured and used by or for Government for governmental purposes, without the payment to me of any royalty thereon.

This invention relates to improvements in the construction of a self-tapping screw particularly adapted for use in wood, laminated synthetic resin impregnated wood, compressed impregnated wood, plastics and the like.

The general object of the invention is to provide a self-tapping screw for use with wood or other materials as noted, the screw being provided with a thread formation such that the screws may be readily driven into wood, or other material, and the screw being provided with means forming a reamer or cutting surface adjacent the outer end of the screw to facilitate tapping and the cutting surface being so constructed to provide a large clearance space for the accumulation of chips which are thereby prevented from jamming in the threads of the screw and creating high frictional forces resisting the driving torque applied to the screw.

The invention is a result of development work on securing propeller blades made of wood, or the materials above set forth, into a propeller hub structure by means of screws driven into the propeller blade shanks parallel with the blade axis and the screws being adapted to transmit tension loads from the blade shank by shear stress and the tension loads being transmitted by the screws into the hub structure. While it is possible to drill the holes tapping size and tap the threads into the wood prior to insertion of the screws, such a procedure is very time consuming, and self-tapping screws were found to be a satisfactory solution except for the fact that abnormally large driving torques were required where the screw lengths were in the neighborhood of from 2½ to 5 inches. In order to overcome the difficulty encountered with the use of conventional self-tapping screws, a screw in accordance with the invention is constructed such that the front face of the thread is inclined to the vertical through a greater angle than in conventional screws while the rear face of the thread is made with a lesser angle than in conventional screws, in fact being substantially the equivalent of a buttress thread face. By the aforementioned thread formation the screws are easier to drive and the buttress thread face eliminates the possibility of splitting the wood when tension loads are applied to the screws. In order to improve the tapping qualities of the screw and to eliminate the friction encountered in conventional screws due to the accumulation of chips in the screw threads, the screw is provided with a reamer or cutting face formed by grinding off the screw adjacent the outer end in a flat plane beginning at the central axis of the screw and making an angle of approximately ten degrees with the axis of the screw. The edges of this surface then form a reamer which cleans up the drilled hole as the screw is driven into the wood or other material and the portion of the screw cut away allows ample room for the collection of chips, which therefore do not collect in the thread making it possible to drive the screws with much less torque than is necessary in driving screws of a conventional character.

Figure 2:
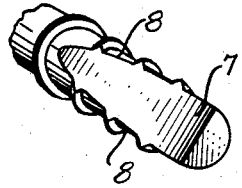

For a more detailed description of the invention, reference may be had to the appended drawing, in which Figure 1 illustrates to an enlarged scale a side elevation of a screw constructed in accordance with the invention;

Figure 2 is a perspective view of the outer end portion of the screw of Figure 1 illustrating the reamer or cutting face which forms an important feature of the invention.

Referring now to Figure 1, the screw generally indicated by the reference numeral 1 is provided with a head 2 and a shank portion 3 having a slightly less diameter than the diameter of the screw over the threads. The screw is provided with threads 4 having a pitch preferably of the order of eight threads per inch. The front face of the threads, indicated by reference numeral 5, is inclined to the vertical at an angle of thirty-five degrees while the rear face of the thread, indicated by reference numeral 6, is inclined at an angle of fifteen degrees to the vertical so that the included angle of the thread is fifty degrees, the front face of the thread being inclined to the vertical at a greater angle than conventional threads can be driven into the wood with the application of a small torque, while the rear face of the thread approaching a buttress thread provides adequate bearing on wood or similar materials, when tension loads are applied to the screws and eliminating the possibility of splitting. Adjacent its outer end the screw is ground off on a flat plane 7 such that the plane begins at the center line of the screw and extends backward with a slope preferably of the order of ten degrees with the axis of the screw. The flat face 7 provides sharp cutting edges 8, as indicated in Figure 2, which serve as a reamer and clean up the tap-drilled hole in the wood, or other material, in which the screw is to be driven, and the material ground off of the screw leaves ample room for the collection of chips formed by the first few threads of the screw serving as a tap, as the screw is advanced into the wood, and it has been found that the provision of the reamer or cutting face 7 has very materially reduced the torques required to drive long screws into the wood, particularly when coupled with the thread angle formation as previously described; and under static load tests, screws constructed into accordance with the invention have developed as high a shear stress in the material as conventional screws without evidence of splitting in the wood due to a side thrust from the screw threads.

While a preferred form of the invention has been illustrated and described, other variations and modifications thereof will become apparent to those skilled in the art as falling within the scope of the invention as defined in the appended claim.

I claim:

In a self-tapping parallel thread screw for use in wood or similar materials and the threads extending substantially to the outer or entering end of the screw; the improvement which comprises the provision of a single inclined plane surface extending inwardly from a diametrical width at the outer end of the screw and terminating at the outer periphery of the threads, the length of said surface being substantially greater than the diameter of the screw, and the marginal edges of the surface forming cutting edges.

CLIFFORD R. GASKELL.